(No Model.)
E. Z. COLLINGS & C. F. PIKE.
SEWER FLUSHING DEVICE.
No. 275,803. Patented Apr. 17, 1883.
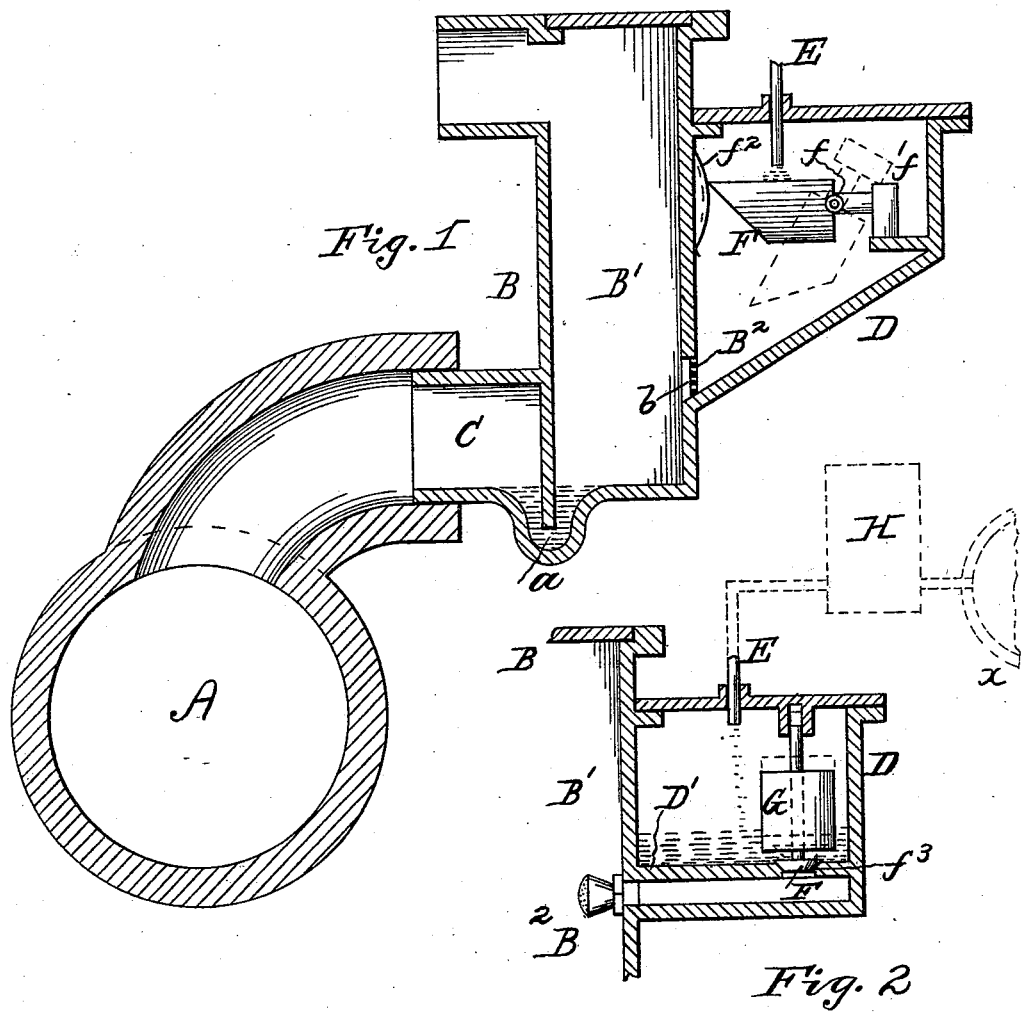

UNITED STATES PATENT OFFICE.

EDWARD Z. COLLINGS, OF CAMDEN, NEW JERSEY, AND CHARLES F. PIKE, OF PHILADELPHIA, PENNSYLVANIA.

SEWER-FLUSHING DEVICE.

SPECIFICATION forming part of Letters Patent No. 275,803, dated April 17, 1883.

Application filed August 10, 1882. (No model.)

*To all whom it may concern:*

Be it known that we, EDWARD Z. COLLINGS, of Camden, in the county of Camden and the State of New Jersey, and CHARLES F. PIKE, of Philadelphia, in the county of Philadelphia and State of Pennsylvania, citizens of the United States, have invented certain new and useful Improvements in Sewer-Inlets, of which the following is a specification, reference being had therein in the accompanying drawings, wherein—

Figure 1 is a transverse vertical section of a sewer and inlet embodying our improvements, and Fig. 2 is a detail section of a modification of same.

Our invention has relation to sewer-inlets, and has for its object to effect a constant flushing of such devices, whereby their traps are kept clean, and the sealing-water thereof maintained in a pure condition to prevent the passage or filtration of sewer-gas therethrough.

Our invention accordingly consists of a sewer-inlet having a chamber provided with a flushing device, and a pipe or conduit leading to the water-main, a branch thereof, or other source of constant water-supply, whereby a continuous flow of water is conducted to said chamber for effecting constant flushing of the sewer-inlet.

Referring to the accompanying drawings, A represents a sewer; B, an inlet therefor, and C an intervening pipe or conduit. The inlet B is provided with a chamber or pocket, D, having a pipe, E, designed to connect with the water-main $x$, Fig. 2, a branch pipe thereof, or a cistern, and is constructed and arranged, as fully described in an application filed by us of even date herewith, to provide for a continual flow of water to chamber D. Within the latter is a box or cup valve, F, pivoted at $f$ to walls of chamber D, and provided with a weight, $f'$. As the water from pipe E flows into valve F it rises therein until the gravity of the same overbalances the weight $f'$, whereupon the valve F falls and dumps the water contained therein into chamber D, from whence it passes to the inlet A to flush the trap $a$ to cleanse the same, and keep the seal therefor in a good condition to enable it to absorb any sewer-gas making its way thereinto from the sewer. If desired, a spring, $f^2$, may be employed to prevent the valve F falling too quickly or rising too rapidly, thereby avoiding the noise incident to the use of such dumping-valves. As often as the water from pipe E fills valve F the latter is tilted and the inlet flushed, and as the supply from pipe E is continuous it follows that a constant flush is provided for the inlet, thereby keeping its trap free of débris, and maintaining its seal in such condition that the gas from the sewer will be absorbed thereby, and thus be prevented from passing or filtering therethrough to the inlet. In lieu of a pivoted valve, F, and weight $f'$ shown in Fig. 1, the construction shown in Fig. 2 may be employed, wherein the valve F is seated at $f^3$ on partition D' in chamber B, and is provided with a float, G.

The operation is obvious. As water from pipe E fills chamber D the float G and valve F rise to permit the escape of such water for flushing trap $a$. We have shown and described a tilting and a float mechanism for effecting the flush; but we do not desire to be understood as claiming any particular flushing apparatus, as various modifications of the same may be employed. So, too, a screen or grating, B², may be placed at the opening $b$ in chamber B', so that when the water passes out thereof it will be atomized or divided into small streams, the better to absorb any odors that may be brought into the inlet by the waste water from the street; or a nozzle, B², may be used in lieu thereof, as shown in Fig. 2. Again, a reservoir or tank, H, containing a disinfectant may be connected to the pipe E at any suitable point to provide for a flush of disinfectant-water for trap $a$. The advantages of such disinfectant-fluid and the spraying of the same or the water are fully set forth in an application filed by us of even date herewith, and need not therefore be more particularly described.

What we claim as our invention is—

1. The combination, with a sewer-inlet provided with a flushing device, of a pipe or conduit leading to a constant source of water-supply, and a reservoir, adapted to contain a disinfectant located in the path of said pipe, substantially as shown and described.

2. The combination, in a sewer-inlet, of a flushing device, a water-supply pipe, E, and nozzle or grating B², substantially as shown and described.

In testimony whereof we affix our signatures in presence of two witnesses.

EDWARD Z. COLLINGS.
CHARLES F. PIKE.

Witnesses:
S. J. VAN STAVOREN,
CHAS. F. VAN HORN.